US005656797A

United States Patent [19]

Lin

[11] Patent Number: 5,656,797

[45] Date of Patent: Aug. 12, 1997

[54] PROTECTIVE JACKET FOR LIGHT STRINGS

[76] Inventor: Shwu-Min Lin, 10F-2, No. 197, Chung-Hsiao E. Rd., Sec. 4, Taipei, Taiwan

[21] Appl. No.: 512,919

[22] Filed: Aug. 9, 1995

[51] Int. Cl.[6] ........................ H02G 15/113; H01R 4/22

[52] U.S. Cl. ........................ 174/91; 174/92; 174/138 F

[58] Field of Search ........................ 174/91, 92, 93, 174/84 R, 138 F

[56] References Cited

U.S. PATENT DOCUMENTS

| | | | |
|---|---|---|---|
| 2,267,630 | 12/1941 | Weiland | 174/5 R X |
| 3,049,582 | 8/1962 | Shinn | 174/92 |
| 3,115,541 | 12/1963 | Hanner et al. | 174/92 |
| 3,404,216 | 10/1968 | Amann et al. | 174/84 R |
| 4,029,896 | 6/1977 | Skinner | 174/138 F |
| 4,795,857 | 1/1989 | McInnis | 174/138 F |
| 5,264,663 | 11/1993 | Noguchi et al. | 174/84 R |
| 5,371,323 | 12/1994 | Schneider et al. | 174/92 |

*Primary Examiner*—Kristine L. Kincaid
*Assistant Examiner*—Chau N. Nguyen
*Attorney, Agent, or Firm*—Bacon & Thomas

[57] ABSTRACT

A protective jacket is formed of two symmetrical half-round shells molded from rigid, transparent plastics and fastened together by hooks thereof and secured to the electric wire of a light string to protect a bulb. Each half-round shell has two opposite pairs of half-round holes for the passing of the electric wire, two partition ribs defining a chamber for holding the bulb, an upright stop plate stopped at one end of the bulb to separate the lead wires, and a longitudinal series of upright stop rods for stopping the bulb against the upright stop plate.

3 Claims, 5 Drawing Sheets

PROTECTIVE JACKET FOR LIGHT STRINGS

BACKGROUND OF THE INVENTION

The present invention relates to a protective jacket for mounting around the electric wire of a light string to protect a bulb. The protective jacket is comprised of two rigid symmetrical shells connected together by hooks thereof, having stop plate and stop rods for holding the bulb in place.

The connection area between the bulbs and the electric wires in light strings must be well wrapped to prevent an electric leakage. As illustrated in FIG. 1, when a bulb 11 is installed in the electric wire 10 of a light string, the bulb 11 and the lead wires 12, 13 and 14 are exposed to the outside, and therefore a tubular jacket 15 is used and sleeved onto the electric wire 10 to protect the bulb 11 and the lead wires 12, 13 and 14. The tubular jacket 15 is molded from a soft, transparent plastics. When the tubular jacket 15 is sleeved onto the electric wire 10, it is moved in the direction of the arrow A to the bulb 11 to further cover the bulb 11 and the lead wires 12, 13 and 14. This structure of jacket 15 will be damaged easily by an impact. Furthermore, because the jacket 15 is simply sleeved onto the electric wire 10 and covered over the bulbs 11 and the lead wires 12, 13 and 14, when the electric wire 10 is stretched, the lead wires 12, 13 and 14 tend to be displaced, causing a short circuit. Therefore, this structure of jacket 15 is still not satisfactory in function.

SUMMARY OF THE INVENTION

The present invention has been accomplished to provide a protective jacket for light strings which eliminates the aforesaid drawbacks.

According to the present invention, the protective jacket is formed of two symmetrical half-round shells molded from rigid, transparent plastics and fastened together by hooks thereof and secured to the electric wire of a light string to protect a bulb, wherein each half-round shell comprises two opposite pairs of half-round holes for the passing of the electric wire, two partition ribs defining a chamber for holding the bulb, an upright stop plate stopped at one end of the bulb to separate the lead wires, and a longitudinal series of upright stop rods for stopping the bulb against the upright stop plate.

DETAILED DESCRIPTION OF THE PREFERRED EMBODIMENT

Figure 1:
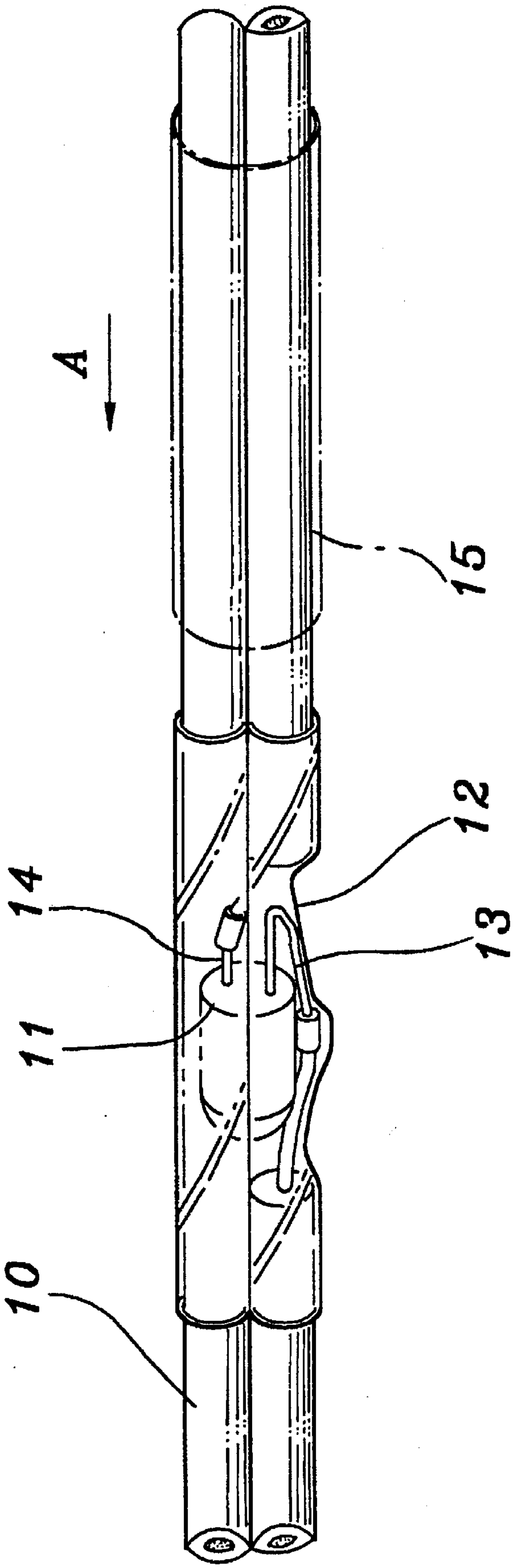
FIG. 1 (PRIOR ART)
FIG. 1 shows a tubular jacket sleeved onto the electric wire of a light string according to the prior art.
Figure 2:
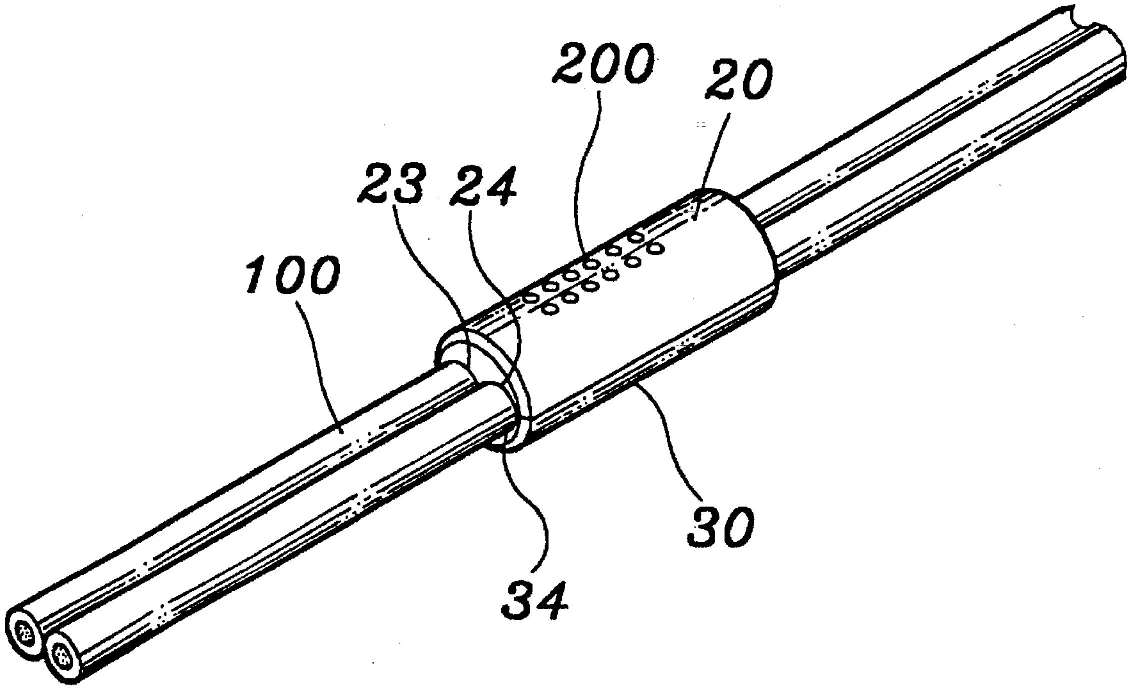
FIG. 2 shows a protective jacket installed in a light string according to the present invention.
Figure 3:
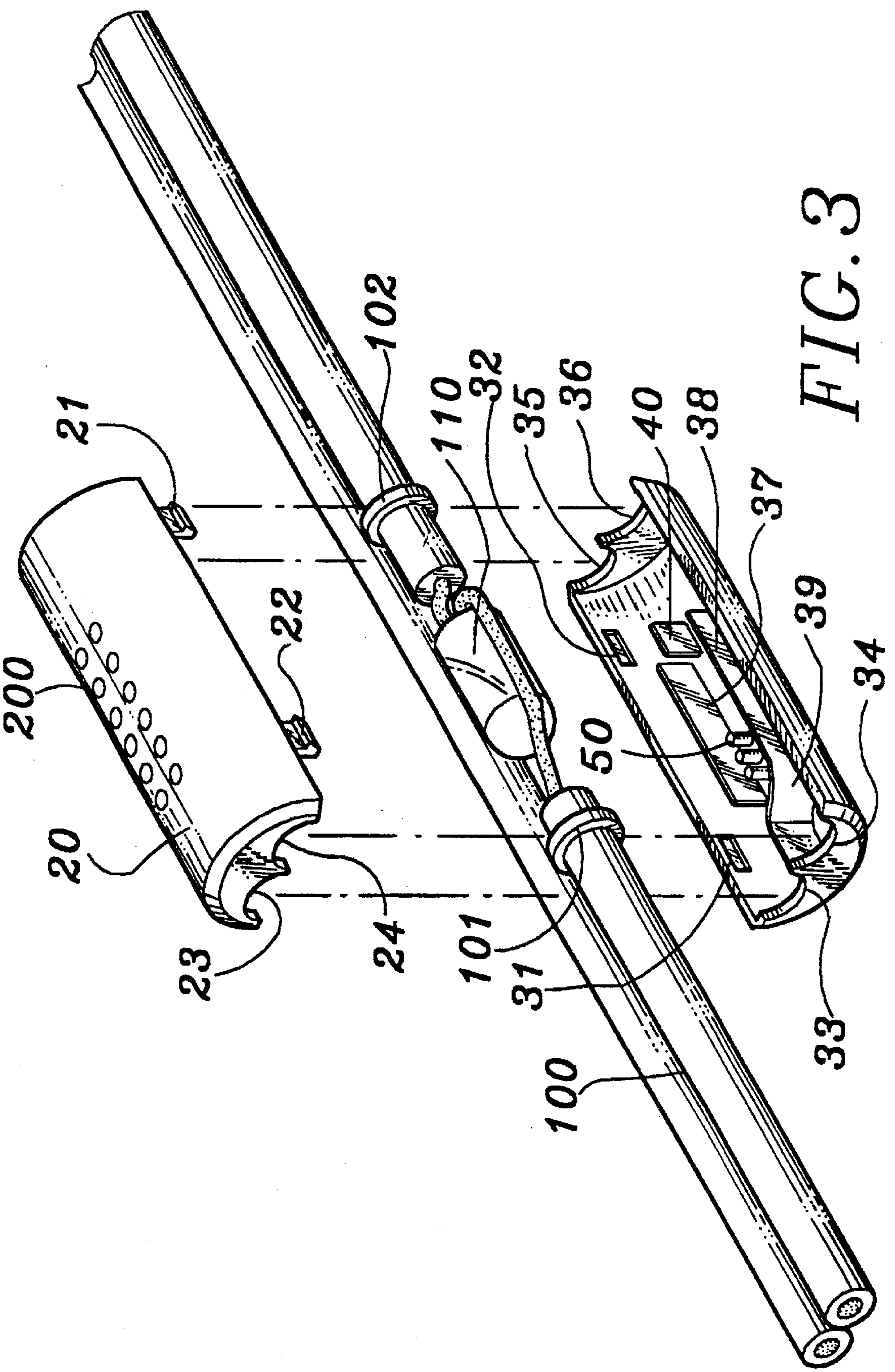
FIG. 3 is an exploded view of FIG. 2.

Referring to FIGS. 2 and 3, a protective jacket in accordance with the present invention is generally comprised of cylindrical casing formed of two symmetrical half-round shells, namely, the first half-round shell 20 and the second half-round shell 30 respectively molded from rigid, transparent plastics. The first half-round shell 20 and the second half-round shell 30 are fastened together and mounted on the two-line electric wire 100 around the bulb 110 by hooking respective hooks 21 and 22 on the first half-round shell 20 into respective hook holes 31 and 32 on the second half-round shell 30. The half-round shell 20 (30) comprises a plurality of heat dissipating holes 200, two opposite pairs of half-round holes 23 and 24 (33 and 34, 35 and 36) at two opposite ends, which receive the two-line electric wire 100, two opposite partition ribs 37 and 38 longitudinally disposed on the side, one rib 38 having a curved portion 39 at one end turned toward the midpoint between one pair of half-round holes 33 and 34, an upright stop plate 40 spaced between the partition ribs 37 and 38 at one end remote from the curved portion 39, and a longitudinal series of upright stop rods 50 spaced between the partition ribs 37 and 38 at an opposite end remote from the upright stop plate 40. The upright stop rods 50 have a respective bottom end (the root) reduced in diameter so that they can be selectively broken subject to the size of the bulb 110 being used.

Figure 4:
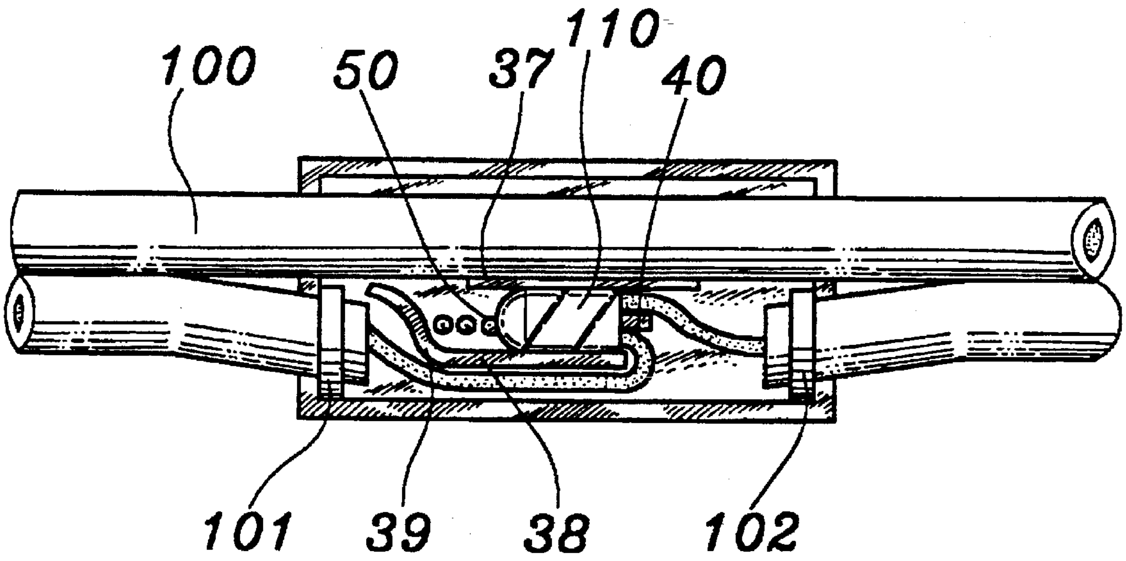
FIG. 4 is a longitudinal view in section of FIG. 2.

Referring to FIG. 4, the bulb 110 is inserted between the partition ribs 37 and 38 and stopped between the upright stop plate 40 and one upright stop rod 50. When installed, the two opposite lead wires of the bulb 110 are separated by the upright stop plate 40. Furthermore, annular grooves 101 and 102 may be made on each insulated conductor of the two-line electric wire 100 for engagement with the pair of holes 23, 24, 33, 34, 35, and 36.

Figure 5:
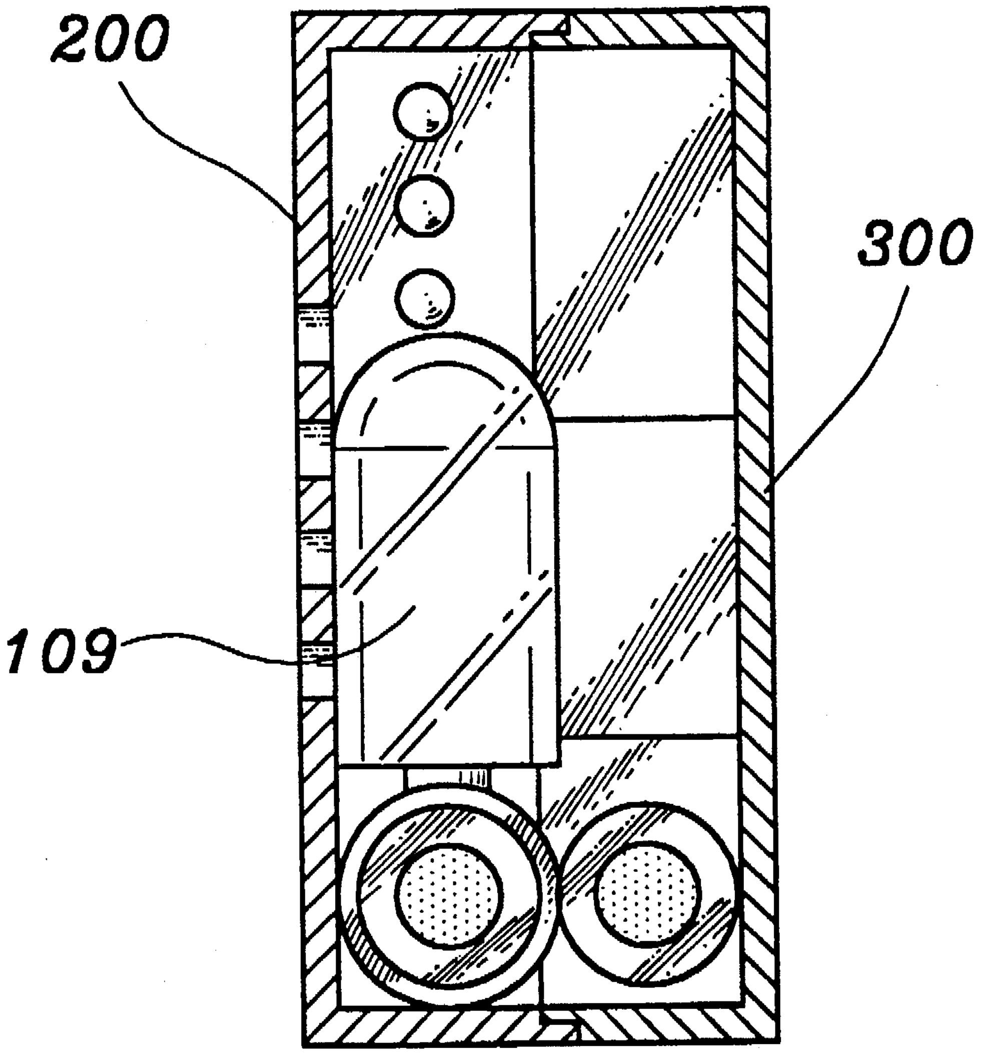
FIG. 5 is a cross section of an alternate form of the present invention.

FIG. 5 shows an alternate form of the present invention in which the half-round shells 200 and 300 fit the installation of a vertical bulb 109.

Referring to FIGS. 2 and 4 again, when the half-round shells 20 and 30 are fastened together and mounted around the electric wire 110, they are tightly secured to the electric wire 110 to protect the bulb 110. Because the lead wires of the bulb 110 are separated by the upright stop plate 40, they are prohibited from causing a short circuit. Because the half-round shells 20 and 30 are made from rigid plastics, they are impact resistant.

What is claimed is:

1. A protective jacket comprising a cylindrical casing fastened to a two-line electric wire of a light string; a light bulb on the light string and covered by said cylindrical casing, said cylindrical casing comprised of two transparent, symmetrical half-round shells respectively molded from rigid, transparent plastics and fastened together by hooks thereof, each of said transparent, half-round shells comprising two opposite pairs of half-round holes, through which the two-line electric wire passes; two opposite partition ribs longitudinally disposed on a side of said half-round shells; a chamber defined between said partition ribs, which receives said light bulb; an upright stop plate disposed in said chamber at one end to stop one end of said light bulb, and a longitudinal series of breakable, upright stop rods disposed in said chamber at an opposite end of said light bulb for fixing said light bulb against said upright stop plate.

2. The protective jacket of claim 1 wherein said two-line electric wire has a plurality of annular grooves engaged with the half-round holes on said half-round shells.

3. A protective jacket comprising a cylindrical casing fastened to a two-line electric wire of a light string to protect a bulb on the light string, said cylindrical casing comprised of two symmetrical half-round shells respectively molded from rigid, transparent plastics and fastened together by hooks thereof, each of said half-round shells comprising two opposite pairs of half-round holes, through which the two-line electric wire passes, two opposite partition ribs longitudinally disposed on a side of said half-round shells, a chamber defined between said partition ribs, which receives said bulb, an upright stop plate disposed in said chamber at one end and stopped at one end of said bulb, and a longitudinal series of upright stop rods disposed in said chamber at an opposite end for stopping said bulb against said upright stop plate, wherein said longitudinal series of upright rods have a respective bottom end reduced in diameter.

* * * * *